United States Patent
Ito

(10) Patent No.: US 12,407,907 B2
(45) Date of Patent: Sep. 2, 2025

(54) DISPLAY APPARATUS, FINDER APPARATUS, AND IMAGING APPARATUS

(71) Applicant: CANON KABUSHIKI KAISHA, Tokyo (JP)

(72) Inventor: Koichi Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 145 days.

(21) Appl. No.: 18/069,525

(22) Filed: Dec. 21, 2022

(65) Prior Publication Data

US 2023/0224561 A1 Jul. 13, 2023

(30) Foreign Application Priority Data

Jan. 13, 2022 (JP) ................................ 2022-003484

(51) Int. Cl.
*H04N 23/45* (2023.01)
*G02B 27/00* (2006.01)
(Continued)

(52) U.S. Cl.
CPC ......... *H04N 23/45* (2023.01); *G02B 27/0093* (2013.01); *G03B 13/06* (2013.01);
(Continued)

(58) Field of Classification Search
CPC ........ H04N 23/45; H04N 23/53; H04N 23/54; H04N 23/63; H04N 23/611;
(Continued)

(56) References Cited

U.S. PATENT DOCUMENTS

| 2013/0114850 A1* | 5/2013 | Publicover ........... | A61B 3/0025 382/103 |
| 2016/0166190 A1* | 6/2016 | Publicover ........... | A61B 5/1103 351/210 |

(Continued)

FOREIGN PATENT DOCUMENTS

| JP | 05-91394 A | 4/1993 |
| JP | 2021182736 A | 11/2021 |

OTHER PUBLICATIONS

The above patent documents were cited in a European Search Report issued on Jun. 27, 2023, which is enclosed, that issued in the corresponding European Patent Application No. 22215762.0.

(Continued)

*Primary Examiner* — Twyler L Haskins
*Assistant Examiner* — John H Morehead, III
(74) *Attorney, Agent, or Firm* — Cowan, Liebowitz & Latman, P.C.

(57) ABSTRACT

A display apparatus according to the present invention, includes: a display panel; a display optical system for looking at the display panel; an image sensor for capturing an eye of an user looking at the display panel, the image sensor having a rectangular imaging plane; and an imaging optical system for forming an optical image of the eye on the imaging plane, wherein the imaging optical system has an optical axis that is nonparallel to an optical axis of the display optical system, and a projected line of the optical axis of the display optical system on the imaging plane is substantially parallel to a long side of the imaging plane.

10 Claims, 10 Drawing Sheets

(51) Int. Cl.
　　　*G03B 13/06*　　　(2021.01)
　　　*H04N 23/53*　　　(2023.01)
　　　*H04N 23/54*　　　(2023.01)
　　　*H04N 23/63*　　　(2023.01)
(52) U.S. Cl.
　　　CPC ............. *H04N 23/53* (2023.01); *H04N 23/54* (2023.01); *H04N 23/63* (2023.01)
(58) Field of Classification Search
　　　CPC ........ G02B 27/0093; G02B 2027/0138; G02B 2027/014; G02B 27/0172; G06V 40/18; G06V 40/19; G03B 13/06
　　　See application file for complete search history.

(56) References Cited

U.S. PATENT DOCUMENTS

| | | | | |
|---|---|---|---|---|
| 2020/0075652 | A1* | 3/2020 | Chen ................... | H04N 13/344 |
| 2021/0357027 | A1* | 11/2021 | Yamasaki .............. | H04N 23/60 |
| 2022/0172667 | A1* | 6/2022 | Takagi ............... | G02B 27/0172 |
| 2022/0417397 | A1* | 12/2022 | Siddique ................ | G03B 17/17 |

OTHER PUBLICATIONS

The above foreign patent document was cited in the Mar. 11, 2025 Japanese Office Action, which is enclosed without an English Translation, that issued in Japanese Patent Application No. 2022-003484.

* cited by examiner

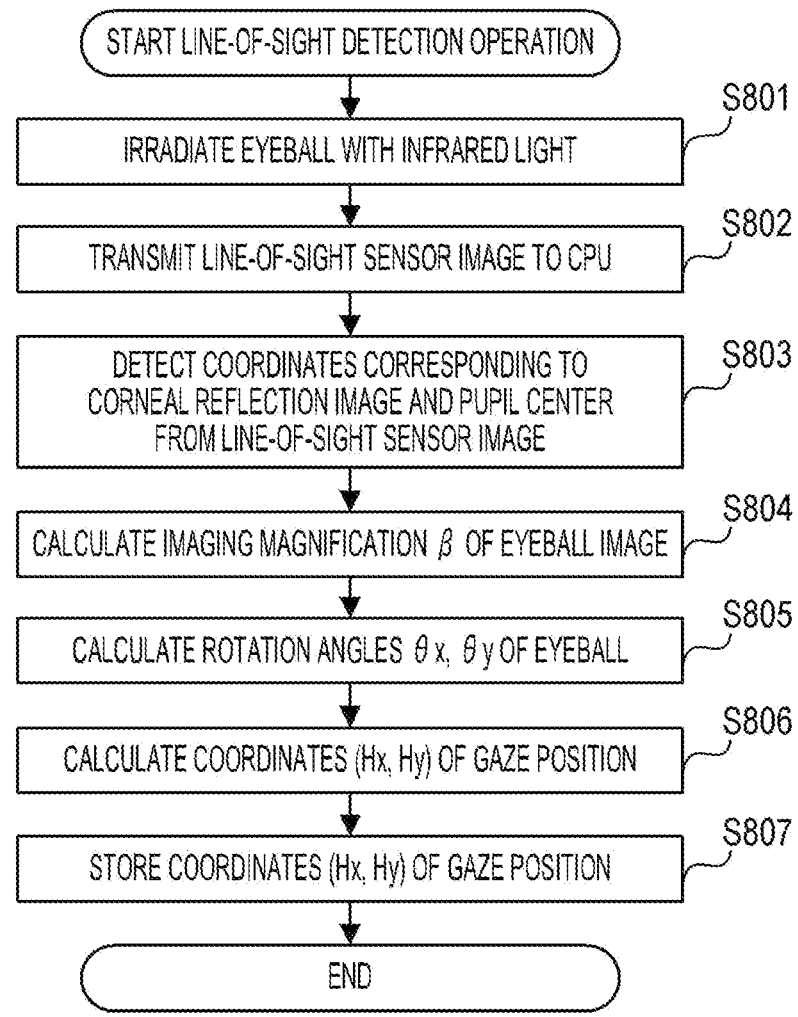

DISPLAY APPARATUS, FINDER APPARATUS, AND IMAGING APPARATUS

BACKGROUND OF THE INVENTION

Field of the Invention

The present invention relates to a display apparatus, a finder apparatus, and an imaging apparatus.

Description of the Related Art

Cameras equipped with a configuration for a line-of-sight input function (such as an eyeball image sensor for capturing a user's eye) in a finder portion have been proposed. When the user peers into the finder of a camera, usually, the distance between an eye lens that is part of the finder optical system (optical system for enabling the user peering into the finder to see an object) and the user's eyeball does not stay constant. Taking this into consideration, there is provided a light-splitting prism as part of the finder optical system for the sake of the line-of-sight input function, the optical axis of an eyeball-imaging optical system (optical system for forming an optical image of the eye on the imaging plane of an eyeball image sensor) and the optical axis of the finder optical system being made partly coincident. Japanese Patent Application Publication No. H05-091394 discloses a video camera that detects a gaze position (position the user is looking at).

Let us assume that, for the video camera shown in Japanese Patent Application Publication No. H05-091394, an attempt is to be made to increase the magnification of the finder optical system or to improve the optical performance of the finder optical system, while retaining the line-of-sight input function. In this case, the presence of the light-splitting prism would necessitate enlargement of the finder portion and a significant increase in the cost. An enlargement of the finder portion and a significant cost increase could be avoided if the light-splitting prism were removed and the optical axis of the eyeball-imaging optical system and the optical axis of the finder optical system were made independent from each other.

SUMMARY OF THE INVENTION

However, if the light-splitting prism were removed and the optical axis of the eyeball-imaging optical system and the optical axis of the finder optical system were made independent from each other, it would be more difficult to capture the user's eye with the eyeball image sensor. For example, as the user' eye moves away from the eye lens, the pupil center position in the image of the eye captured by the eyeball image sensor changes, and the user's eye easily moves out of the imaging range of the eyeball image sensor.

The present invention provides a technique that makes it easier to capture the user's eye without causing an increase in apparatus size or cost.

The present invention in its first aspect provides a display apparatus including: a display panel; a display optical system for looking at the display panel; an image sensor for capturing an eye of an user looking at the display panel, the image sensor having a rectangular imaging plane; and an imaging optical system for forming an optical image of the eye on the imaging plane, wherein the imaging optical system has an optical axis that is nonparallel to an optical axis of the display optical system, and a projected line of the optical axis of the display optical system on the imaging plane is substantially parallel to a long side of the imaging plane.

The present invention in its second aspect provides a finder apparatus including: the above described display apparatus; and an eyepiece portion where the eye approach.

The present invention in its third aspect provides an imaging apparatus including: a second image sensor for capturing an object; and the above described display apparatus capable of displaying an image of the object captured by the second image sensor.

Further features of the present invention will become apparent from the following description of exemplary embodiments with reference to the attached drawings.

BRIEF DESCRIPTION OF THE DRAWINGS

FIG. 10 is a flowchart of a line-of-sight detection operation.

DESCRIPTION OF THE EMBODIMENTS

An embodiment of the present invention is described below.

Figure 1A:
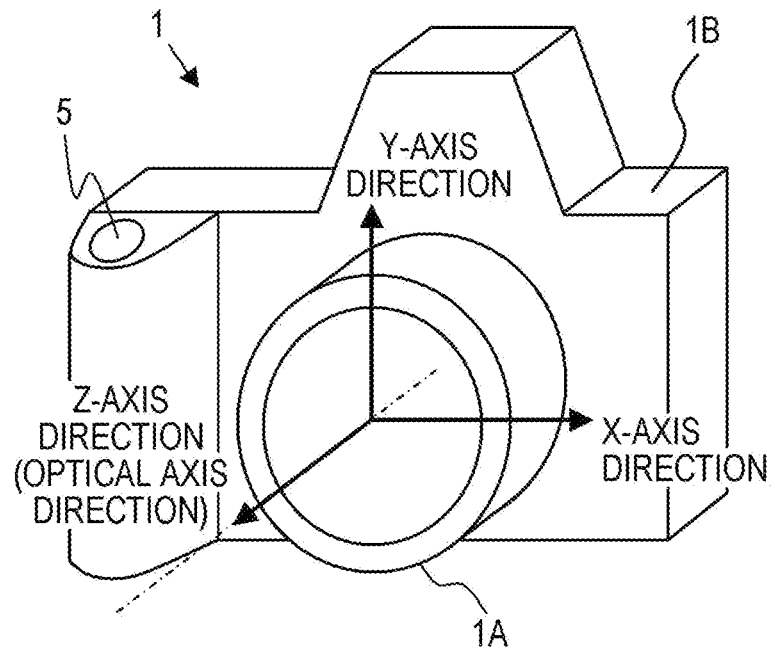
FIGS. 1A and 1B are external views of a camera.
Figure 1B:
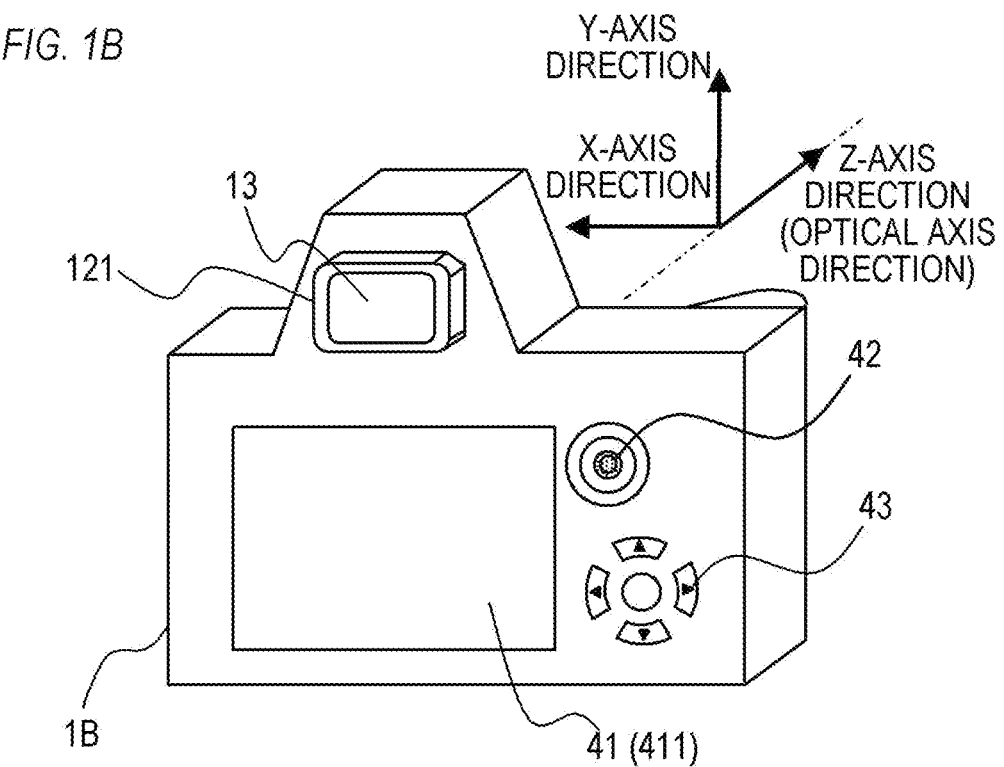

The external appearance of a camera 1 (digital still camera, or lens-replaceable camera), which is an imaging apparatus according to this embodiment, is described with reference to FIGS. 1A and 1B. FIGS. 1A and 1B illustrate the external appearance of the camera 1. The present invention is applicable to any electronic equipment capable of executing a line-of-sight detection operation that detects a user's line of sight (a user's gaze). Users see, for example, information such as images or characters displayed on a display device, or an optical image through an eyepiece optical system (display optical system). Such electronic equipment may include, for example, mobile phones, game machines, tablet terminals, personal computers, wristwatch-type or eyeglass-type information terminals, head mount displays, binoculars, and so on. The line of sight of the user is in other words the user's gaze position in an image or the like displayed in a display device.

FIG. 1A is a front perspective view, and FIG. 1B is a rear perspective view. As shown in FIG. 1A, the camera 1 includes a shooting lens unit 1A and a camera housing 1B. A release button 5, which is an operation member that accepts a shooting operation from the user (photographer), is disposed on the camera housing 1B.

The camera housing 1B shown in FIG. 1A is in a most basic orientation (standard orientation), so-called a normal position state. The optical axis of the optical system of the shooting lens unit 1A in this state is defined as the Z axis, and a vertical upward axis perpendicular to the Z axis is defined as the Y axis. The axis of the right-handed system perpendicular to each of the Y axis and the Z axis is defined as the X axis.

As shown in FIG. 1B, on the backside of the camera housing 1B is disposed an eyepiece frame 121 (eyepiece portion) for the user to peer into, to see an EVF panel 6 contained inside the camera housing 1B as will be described later. The eyepiece frame 121 holds an eyepiece window 13 and protrudes outward (to the backside) from the camera housing 1B. On the backside of the camera housing 1B are also disposed operation members 41 to 43 that accept various operations from the user. For example, the operation member 41 is a touchscreen that accepts touch operations, the operation member 42 is an operation lever that can be pressed down in various directions, and the operation member 43 is a four-direction key that can be pressed in for each of four directions. The operation member 41 (touchscreen) includes a display panel 411 such as a liquid crystal panel, and provides the function of displaying images on the display panel 411.

Figure 2:
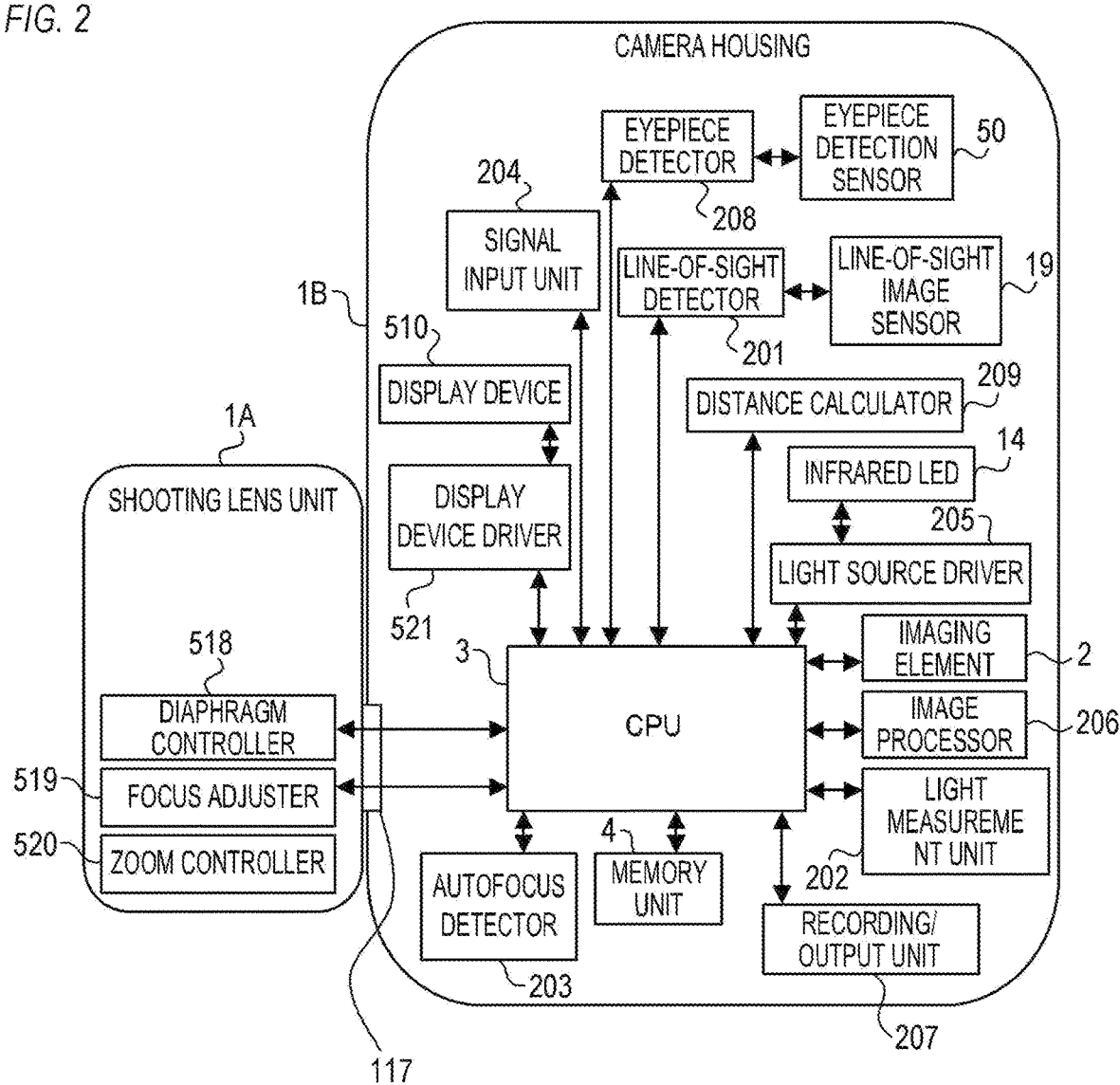
FIG. 2 is a block diagram of the camera.

The configuration inside the camera 1 is described with reference to FIG. 2. FIG. 2 is a block diagram illustrating the configuration inside the camera 1.

Reference numeral 2 denotes an imaging element (image sensor) such as a CCD or CMOS sensor, for example, which is used for capturing an object. The imaging element 2 converts an optical image formed by the optical system of the shooting lens unit 1A on an imaging plane of the imaging element 2 into an electrical signal, and outputs the acquired analog image signal to an A/D converter (not shown). The A/D converter converts the analog image signal acquired by the imaging element 2 into a digital signal, and outputs the signal as image data.

The shooting lens unit 1A is composed of an optical system including a zoom lens, focus lens, diaphragm and so on. In the state mounted in the camera housing 1B, the lens unit guides the light from the object to the imaging element 2, and forms an object image on the imaging plane of the imaging element 2. A diaphragm controller 518, a focus adjuster 519, and a zoom controller 520 each receive instruction signals from a CPU 3 via a mounting contact 117, and drive and control the diaphragm, focus lens, and zoom lens, respectively, in accordance with the instruction signals.

The CPU 3 equipped in the camera housing 1B reads out a control program for each of the blocks in the camera housing 1B from a ROM in a memory unit 4, and deploys and executes the program in a RAM of the memory unit 4. The CPU 3 thus controls the actions of each of the blocks in the camera housing 1B. To the CPU 3 are connected a line-of-sight detector 201, a light measurement unit 202, an autofocus detector 203, a signal input unit 204, a light source driver 205, an eyepiece detector 208, a distance calculator 209, a display device driver 521, and so on. The CPU 3 also transmits signals via the mounting contact 117 to the diaphragm controller 518, focus adjuster 519, and zoom controller 520 disposed inside the shooting lens unit 1A. In this embodiment, the memory unit 4 has the function of storing image signals from the imaging element 2 and a line-of-sight image sensor 19.

The line-of-sight image sensor 19 is an imaging element such as a CCD or CMOS sensor, for example, or an eyeball image sensor used for capturing the eye of the user looking at the EVF panel 6.

The line-of-sight detector 201 converts an output of the line-of-sight image sensor 19 (line-of-sight sensor image), in a state in which an eyeball image (optical image of the eyeball) is formed near the line-of-sight image sensor 19, for example, into a digital signal, and sends the result to the CPU 3. The CPU 3 extracts feature points necessary for line-of-sight detection from the line-of-sight sensor image in accordance with a predetermined algorithm to be described later, and determines the user's line of sight (gaze position on the display surface of the EVF panel 6) by calculation from the positions of the feature points.

The light measurement unit 202 performs amplification, logarithmic compression, and A/D conversion of signals obtained from the imaging element 2 that also doubles as a light measurement sensor, specifically brightness signals corresponding to the brightness of an object field, and sends the results to the CPU 3 as object field brightness information.

The autofocus detector 203 converts voltages of signals from a plurality of detection elements (plurality of pixels) contained in the imaging element 2 and used for phase detection into digital signals, and sends the signals to the CPU 3. The CPU 3 computes distances to the object at respective focus detection points from the signals from the plurality of detection elements. This is a known technique called imaging plane phase detection autofocus. In the case of this embodiment, as one example, there are 180 focus detection points on the imaging plane corresponding to 180 points on the image of the field of view inside the finder (display surface of the EVF panel 6).

Switches SW1 and SW2 are connected to the signal input unit 204. The switch SW1 is for starting light measurement, distance measurement, and line-of-sight detection operation of the camera 1, and turned on by a first stroke (e.g., half press) of the release button 5. The switch SW2 is for starting a shooting operation, and turned on by a second stroke (e.g., full press) of the release button 5. The ON signals from the switches SW1 and SW2 are input to the signal input unit 204, and sent to the CPU 3. The signal input unit 204 also accepts operation inputs from the operation member 41 (touchscreen), operation member 42 (operation lever), and operation member 43 (four-direction key) shown in FIG. 1B.

Reference numeral 14 denotes an infrared LED, which is a light source that irradiates the user's eyeball with an infrared light. The light source driver 205 drives the infrared LED 14 based on signals (instructions) from the CPU 3. For example, the light source driver 205 drives the infrared LED 14 to emit light with a predetermined light-emitting intensity following an instruction from the CPU 3.

An image processor 206 performs various image processes to the image data stored in the RAM of the memory unit 4. The processes includes, for example, correction of pixel defects originating from an optical system or imaging element, demosaicing, white balance adjustment, color interpolation, gamma correction, and so on.

A recording/output unit 207 records data including image data in a removable recording medium such as a memory card, or outputs the data to external equipment via an external interface.

Reference numeral 50 denotes an eyepiece detection sensor, which is for example a near infrared sensor, or a capacitive sensor. The eyepiece detector 208 sends the output of the eyepiece detection sensor 50 to the CPU 3. The CPU 3 determines whether or not the user's eye has contacted (approached) the eyepiece frame 121 (eyepiece portion) from the output of the eyepiece detection sensor 50 (eyepiece detector 208) in accordance with a predetermined algorithm.

The distance calculator 209 calculates the distance from the finder to the user's eyeball based on the coordinates of a corneal reflection image (image formed by regular reflection of an infrared light emitted from the infrared LED 14 on the cornea) in the image captured by the line-of-sight image sensor 19 (line-of-sight sensor image). For example, the distance calculator 209 calculates the distance from the rearmost plane of a display optical system 12 (to be described later) for the user to see the EVF panel 6 to the eye. The distance calculator 209 then transmits the calculated distance to the CPU 3.

The display device driver 521 drives a display device 510 based on signals from the CPU 3. For example, the display device driver 521 displays images of the object captured by the imaging element 2 and various pieces of information on the display device 510. The display device 510 here refers to the display panel 411 or EVF panel 6.

Figure 3:
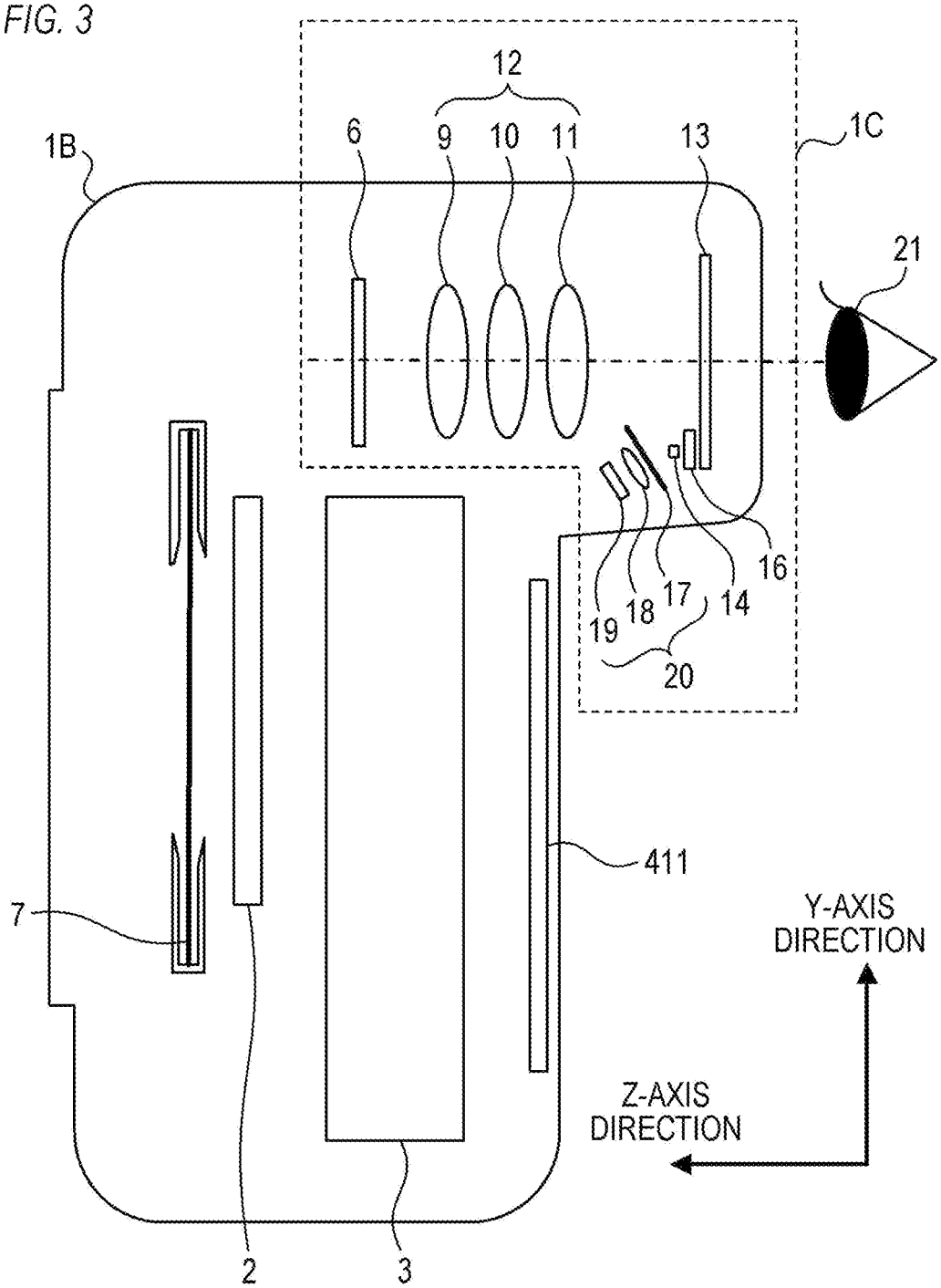
FIG. 3 is a cross-sectional view of a camera housing.

The configuration of the camera housing 1B is described with reference to FIG. 3. FIG. 3 is a cross-sectional view of the camera housing 1B cut in the Y-Z plane made by the Y axis and Z axis shown in FIG. 1A, showing a diagrammatic representation of the configuration of the camera housing 1B. This is a cross-sectional view of the camera housing 1B in a normal position state as viewed from the left-hand side of the user.

A shutter 7 and the imaging element 2 are aligned along the optical axis direction of the shooting lens unit 1A in the camera housing 1B. The display panel 411 is provided on the backside of the camera housing 1B. The display panel 411 shows menus and images for operation of the camera 1 and for viewing and editing of the images acquired by the camera 1. The display panel 411 is configured with a liquid crystal panel with backlighting, or organic EL panel. In an upper part of the camera housing 1B is provided an EVF unit 1C (finder apparatus, or finder module) including the EVF panel 6, display optical system 12, and line-of-sight detection system 20. The EVF panel 6 is able to display the same screen as that of the display panel 411, and configured with a liquid crystal panel with backlighting, or organic EL panel. The display optical system 12 and line-of-sight detection system 20 will be described in more detail later. The EVF unit 1C may be removably attached to the camera housing 1B, or not (may be fixedly attached as part of the camera housing 1B).

Figure 4:
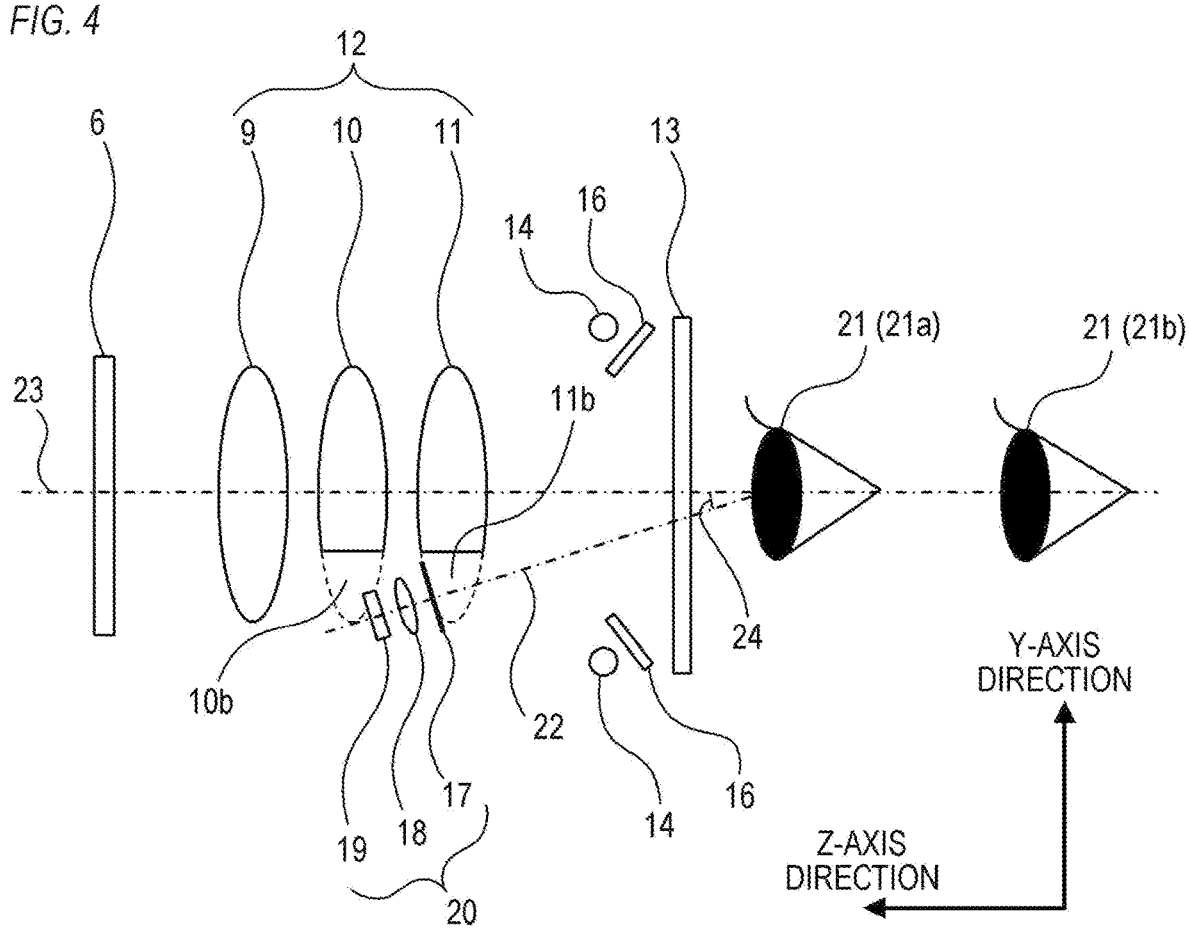
FIG. 4 is a cross-sectional view of an EVF unit.

The configuration of the EVF unit 1C is described with reference to FIG. 4. FIG. 4 is a cross-sectional view of the EVF unit 1C cut in the Y-Z plane, showing a diagrammatic representation of the configuration of the EVF unit 1C.

The EVF panel 6, display optical system 12, and eyepiece window 13 align along a display-optical-system's optical axis 23, which is the optical axis of the display optical system 12.

The display optical system 12 is disposed in front of the display surface of the EVF panel 6, and normally composed of a plurality of lenses to magnify the EVF panel 6. In the case of this embodiment, the display optical system 12 is composed of three lenses, a G1 lens 9, a G2 lens 10, and a G3 lens 11. The number of lenses forming the display optical system 12 is not limited in particular and there may be four or five lenses. The G1 lens 9, G2 lens 10, and G3 lens 11 are optical lenses that transmit visible light and produced by cutting, grinding, or molding from optical glass or transparent optical plastic.

The eyepiece window 13 disposed further in the front of the display optical system 12 (opposite side from the EVF panel 6 across the display optical system 12) is a transparent member having a portion that transmits visible light. An image displayed on the EVF panel 6 is enlarged by the display optical system 12, and observed by the user through a transparent portion of the eyepiece window 13.

The lenses that form the display optical system 12 and the eyepiece window 13 are not necessarily entirely an optically effective shape or surface (e.g., transparent surface). For example, the lenses that form the display optical system 12 and the eyepiece window 13 may have a shape for positioning or reinforcing purposes, or for the operator to grip during assembly, or a shape that provides an adhesion surface for the fixing with adhesive, or may include a lightening hole, and these parts need not be transparent. Moreover, some parts that need not be transparent from a viewpoint of optics (for example, parts that should not transmit light) may have a painted or printed surface that blocks light.

Infrared LEDs 14 and infrared transmission windows 16 are provided at the back of the eyepiece window 13 (on the side facing the EVF panel 6). The infrared transmission window 16 is a window that covers the infrared LED 14 so that it is not visible from outside, and made of resin that absorbs visible light and transmits infrared light.

The line-of-sight detection system 20 is also provided at the back of the eyepiece window 13. The line-of-sight detection system 20 includes a diaphragm 17, a line-of-sight optical system 18, and the line-of-sight image sensor 19, these aligning along a line-of-sight-optical-system's optical axis 22, which is the optical axis of the line-of-sight optical system 18.

The diaphragm 17 is an aperture that regulates the light beams necessary for forming an image of the user's eye (eyeball 21) in the line-of-sight image sensor 19. In this embodiment, the diaphragm 17 is provided with a filter that absorbs visible light and transmits infrared light, in order to detect the light emitted from the infrared LED 14 and reflected by the eyeball 21.

The line-of-sight optical system 18 is an optical system (eyeball-imaging optical system) for forming an optical image of the eyeball 21 on the imaging plane of the line-of-sight image sensor 19, and configured with optical lenses and the like. While FIG. 4 illustrates one lens as the line-of-sight optical system 18, the line-of-sight optical system 18 may include a plurality of lenses.

The line-of-sight image sensor 19 is an eyeball image sensor for capturing the eyeball 21 and outputs an image containing an infrared component (line-of-sight sensor image, for example, a captured image of the user's eye). The imaging plane of the line-of-sight image sensor 19 is rectangular, and so is the line-of-sight sensor image. The line-of-sight sensor image will be described in detail later with reference to FIGS. 8A and 8B.

While the diaphragm 17, line-of-sight optical system 18, and line-of-sight image sensor 19 of the line-of-sight detection system 20 are separate components in this embodiment, the line-of-sight detection system 20 may instead be a small module camera having these components integrated as a package.

In this embodiment, the line-of-sight-optical-system's optical axis 22 and the display-optical-system's optical axis 23 are nonparallel, and intersect each other at an angle 24. More specifically, when the camera housing 1B takes an orientation in the normal position state (predetermined orientation), the line-of-sight detection system 20 is located on the lower side of the Y axis in the EVF unit 1C. The line-of-sight-optical-system's optical axis 22 is directed toward the display-optical-system's optical axis 23 that is positioned on the upper side of the Y axis (diagonally upward in the Y-Z plane).

In some conventional configurations, the display optical system 12 includes a light-splitting mirror or a light-splitting prism as one part thereof, with the line-of-sight-opticalsystem's optical axis 22 partly coinciding with the display-optical-system's optical axis 23. Such a configuration makes it extremely difficult to improve the optical performance of the EVF unit 1C without increasing the size of the EVF unit 1C, as compared to a configuration that does not use a light-splitting mirror or a light-splitting prism. Moreover, light-splitting prisms are generally expensive and cause a cost increase. The configuration according to this embodiment has the line-of-sight-optical-system's optical axis 22 and the display-optical-system's optical axis 23 arranged not in parallel, and does not use a light-splitting mirror or light-splitting prism, so that it is possible to improve the optical performance of the EVF unit 1C without causing an increase in size or cost.

In the case of this embodiment, the line-of-sight-optical-system's optical axis 22 and the display-optical-system's optical axis 23 reside in the same Y-Z plane. These two optical axes need not reside in the same Y-Z plane, for example, and one of the optical axes may be offset in the direction of the X-axis. Namely, the two optical axes may be skew relative to each other.

Figure 5:
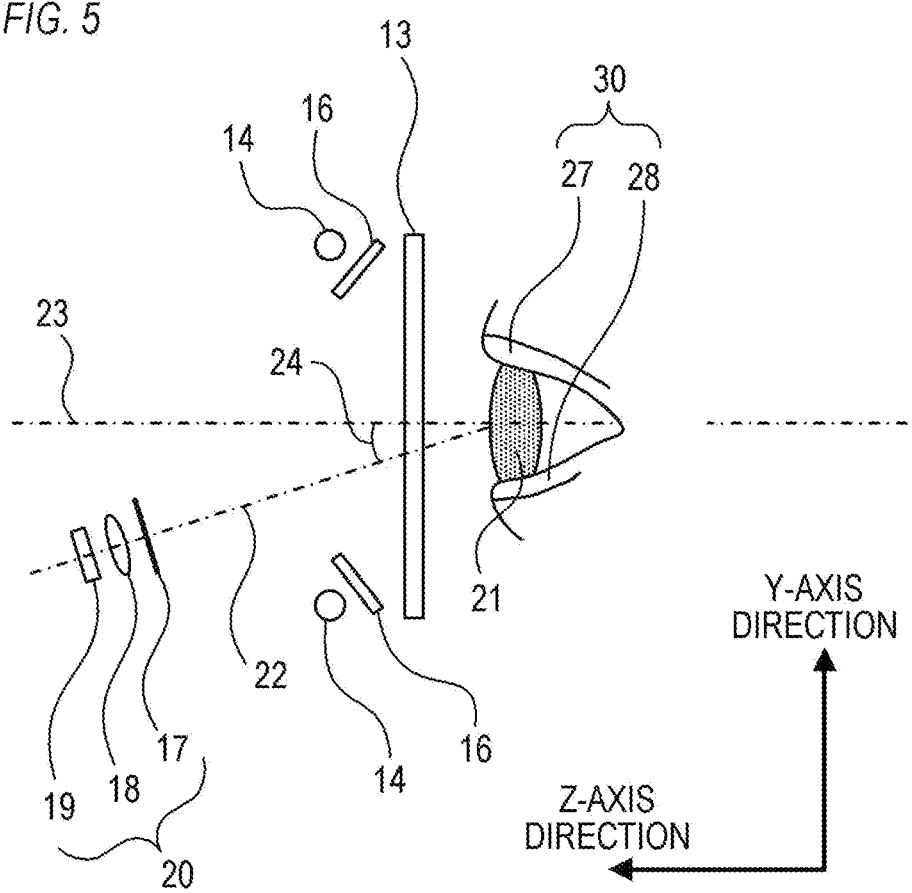
FIG. 5 is a cross-sectional view illustrating part of FIG. 4.

A preferable arrangement of the line-of-sight-optical-system's optical axis 22 and the display-optical-system's optical axis 23 is described with reference to FIG. 5. FIG. 5 is a cross-sectional view illustrating part of FIG. 4.

In FIG. 5, the camera housing 1B takes an orientation in the normal position state, with the eyeball 21 of the user peering into the EVF unit 1C positioned on the display-optical-system's optical axis 23. The eyelid 30 including an upper eyelid 27 and a lower eyelid 28 covers the eyeball 21. The infrared LEDs 14 and infrared transmission windows 16 are disposed such as to emit an infrared light to the eyeball 21 each from above and below the display-optical-system's optical axis 23.

The line-of-sight-optical-system's optical axis 22 (line-of-sight image sensor 19) is disposed upward toward the eyeball 21 from below the display-optical-system's optical axis 23 (display optical system 12 or EVF panel 6), i.e., from a direction in which there is the user's lower eyelid 28. In most cases, upper eyelids 27 are larger and thicker than lower eyelids 28. Therefore, with the line-of-sight-optical-system's optical axis 22 disposed upward toward the eyeball 21 from the lower eyelid 28 side, it is easier to capture the eyeball 21 than in the case where the line-of-sight-optical-system's optical axis 22 is disposed downward toward the eyeball 21 from the upper eyelid 27 side. More specifically, the occurrence of vignetting caused by the eyelid 30 blocking the eyeball 21 can be reduced when the line-of-sight image sensor 19 captures the eyeball 21. Similarly, this arrangement can reduce the instances in which the eyelid 30 blocks the image of a primary light beam of the regular reflection component of infrared light emitted from the infrared LED 14 (corneal reflection image, Purkinje image or Purkinje reflex). The smaller the angle 24, i.e., the closer the line-of-sight-optical-system's optical axis 22 and the display-optical-system's optical axis 23 to parallel or coincident, the more easily the line-of-sight detection system 20 can capture the image of the eyeball 21. Therefore, the angle 24 should preferably be small.

Since the camera 1 can be gripped in various manners when in use, the user (eyeball 21) can take various orientations (relative orientations) relative to the orientation of the camera housing 1B. Therefore, the orientation of the line-of-sight-optical-system's optical axis 22 should preferably be set upward toward the eyeball 21 from the lower eyelid 28 side in a camera orientation (with relationships between the orientation or position of the camera housing 1B, eyeball 21 and eyelid 30) expected to occur most frequently.

Figure 6:
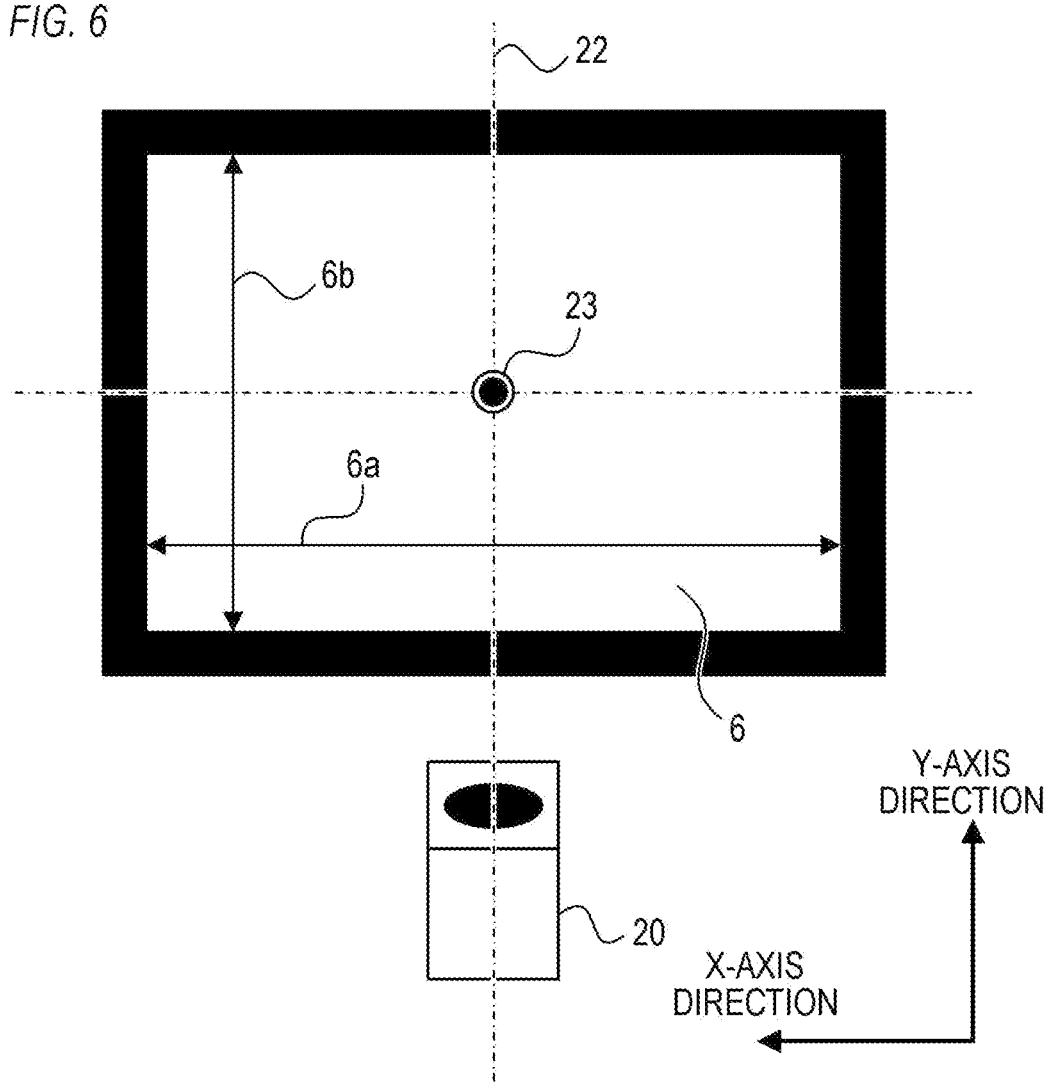
FIG. 6 is a diagram illustrating an arrangement of an EVF panel and a line-of-sight detection system.
Figure 7:
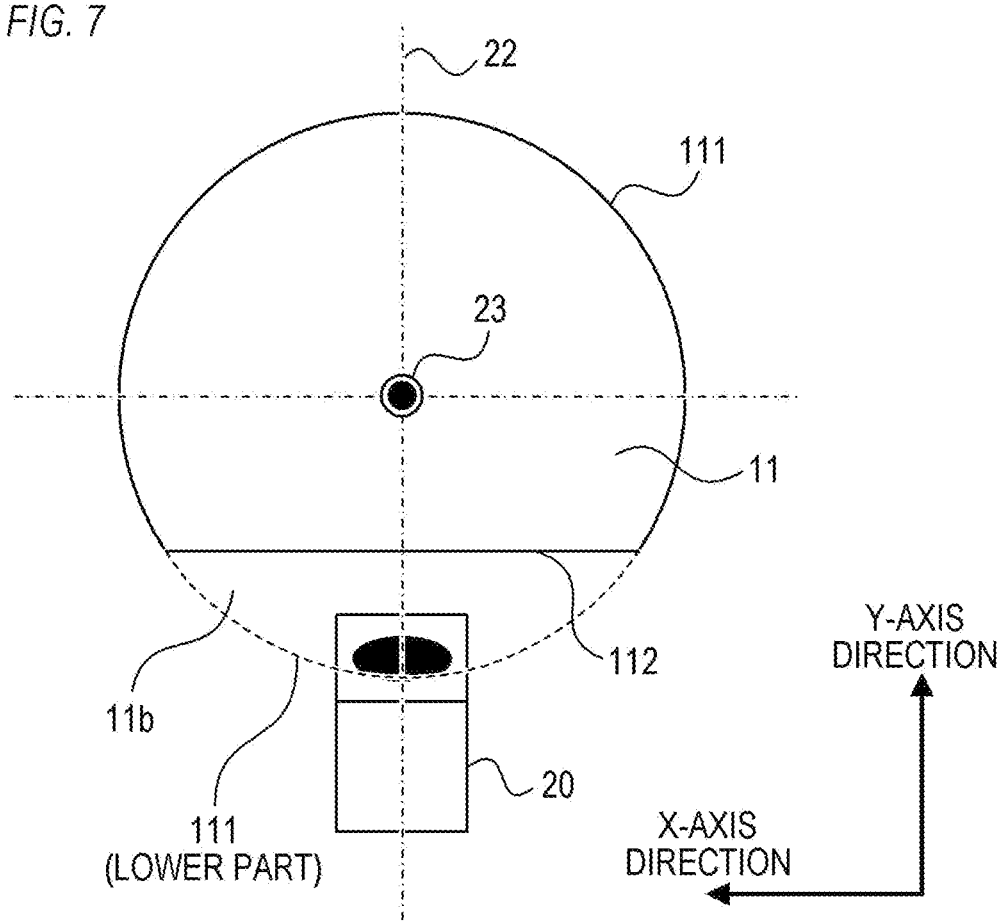
FIG. 7 is a diagram illustrating an arrangement of a G3 lens and the line-of-sight detection system.

The arrangement of the line-of-sight detection system 20 is described in more detail with reference to FIGS. 6 and 7. FIGS. 6 and 7 illustrate the line-of-sight detection system 20, which is made up of a plurality of components, as one module or unit. FIG. 6 shows a diagrammatic view of the arrangement of the EVF panel 6 and line-of-sight detection system 20 as viewed from the eyeball 21.

As shown in FIG. 6, in a view from the eyeball 21 on the display-optical-system's optical axis 23, the EVF panel 6 has a display surface that is a horizontal rectangle, having a lateral side 6a (a side substantially parallel to a lateral or left and right direction) longer than a vertical side 6b (a side substantially parallel to a vertical or up and down direction). The length of the lateral side 6a and the length of the vertical side 6b satisfy the following equation 1. Namely, three times the length of the lateral side 6a (long side of the display surface of the EVF panel 6) is four times the length of the vertical side 6b (short side of the display surface of the EVF panel 6) or more. For example, the aspect ratio (length of lateral side 6a:length of vertical side 6b) of the display surface of the EVF panel 6 is substantially 4:3.

$$3\times\{\text{length of lateral side }6a\} \geq 4\times\{\text{length of vertical side }6b\} \quad \text{(Equation 1)}$$

The line-of-sight detection system 20 is disposed upward from below the EVF panel 6 having the display surface. This way, the occurrence of vignetting can be reduced as described above. Moreover, the display surface of the EVF panel 6 being horizontally long (with short vertical sides 6b) makes the angle 24 between the line-of-sight-optical-system's optical axis 22 and the display-optical-system's optical axis 23 small, which makes it easier to reduce the occurrence of vignetting. Provided that the display surface of the EVF panel 6 has a constant area, the larger the aspect ratio (length of lateral side 6a/length of vertical side 6b), the more largely vignetting can be reduced. This is not to say that the shape of the display surface of the EVF panel 6 is limited to one that satisfies Equation 1.

FIG. 7 shows a diagrammatic view of an arrangement of the G3 lens 11 of the display optical system 12 and the line-of-sight detection system 20 as viewed from the eyeball 21 (from a direction parallel to the display-optical-system's optical axis 23).

The G3 lens 11 is an optical lens that forms part of the display optical system 12, and has an optical surface necessary for displaying the EVF panel 6 to a larger scale, inside a lens periphery 111 that is a peripheral portion of a circular shape about the display-optical-system's optical axis 23. The light beams necessary for displaying the EVF panel 6 to a larger scale need not pass through the entire optical surface of the G3 lens 11, and therefore the lens periphery 111 may be removed (cut off) partly or entirely along a straight or curved line as required. In FIG. 7, a lower part of the lens periphery 111 is cut off along a cut-off line 112 that is a straight line. The line-of-sight detection system 20 (line-of-sight image sensor 19) is disposed such that the line-of-sight detection system 20 (line-of-sight image sensor 19) is partly included in the cut-off region 11b surrounded by the lower part of the lens periphery 111 and the cut-off line 112. The cut-off line 112 is substantially parallel to the lateral side 6a of the EVF panel 6 (FIG. 6). This way, the line-of-sight detection system 20 can be disposed even closer to the display-optical-system's optical axis 23, so that the line-of-sight-optical-system's optical axis 22 and the display-optical-system's optical axis 23 can be made closer to parallel (coincident). The line-of-sight detection system 20 (line-of-sight image sensor 19) may be entirely located inside the cut-off region 11b. The cut-off line may include a straight portion substantially parallel to the lateral side 6a of the EVF panel 6 and a non-straight portion.

Since the lenses of the display optical system 12 including the G3 lens 11 are produced by cutting, grinding, or molding from optical glass or transparent optical plastic, the cut-off line 112 should preferably be a simple straight line from the viewpoints of processing cost and reliable optical performance. Nevertheless, the cut-offline 112 is not limited to straight lines. For example, the cut-off line 112 may be a curve including a straight line in part, or the cut-off line 112 may be a curve in its entirety. A cylindrical hole may be formed in the lens periphery 111 by performing a drilling (punching) process to the lens periphery 111, and the line-of-sight detection system 20 may be disposed such that the line-of-sight-optical-system's optical axis 22 extends through this cylindrical hole. In this case, the cut-off line 112 will be a circular shape, or an elliptical shape. Cutting or molding may be performed such as to form an arcuate cut-off line 112.

Further, the cut-off region may be provided to only one of the lenses of the display optical system 12, or to a plurality of lenses. In FIG. 4, two (G2 lens 10 and G3 lens 11) of the three lenses of the display optical system 12 each have a cut-off region 10b or 11b. The line-of-sight detection system 20 is disposed such that the line-of-sight detection system 20 is partly included in the cut-off regions 10b and 11b in a view from a direction parallel to the display-optical-system's optical axis 23.

Figure 9A:
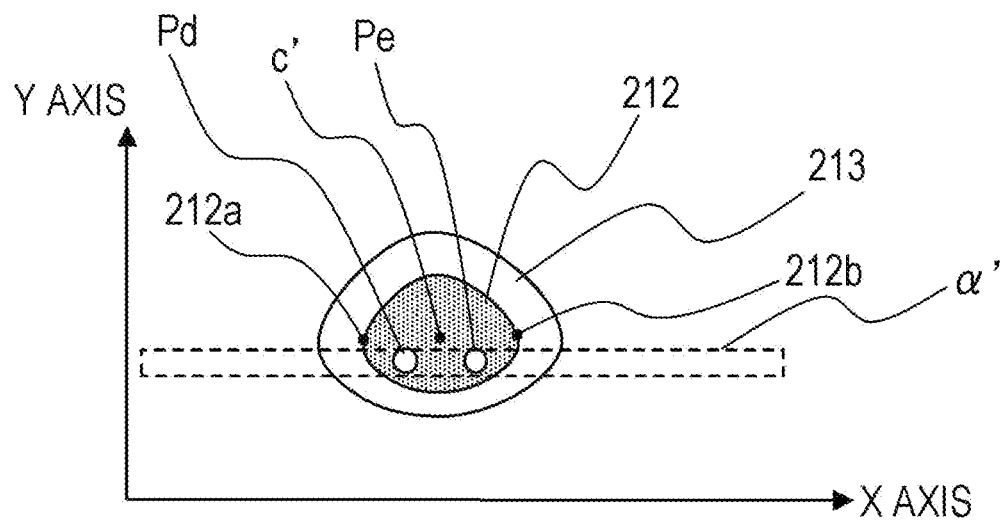
FIGS. 9A and 9B are diagrams illustrating line-of-sight sensor images.
Figure 9B:
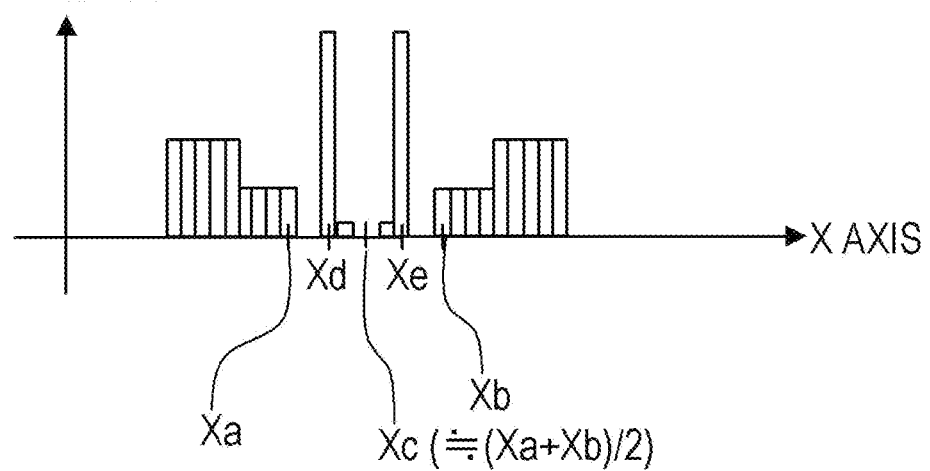

A method of detecting a line of sight with the use of the line-of-sight detection system 20 is described with reference to FIGS. 9A, 9B, and 10. FIG. 9A is a schematic diagram illustrating an image captured by the line-of-sight image sensor 19 (line-of-sight sensor image). FIG. 9A illustrates a line-of-sight sensor image obtained in a condition in which an eyeball image is projected to the line-of-sight image sensor 19. FIG. 9B is a diagram illustrating the output intensity (brightness of the line-of-sight sensor image) of the line-of-sight image sensor 19. FIG. 9B shows the brightness information (brightness distribution) of region a of FIG. 9A. FIG. 9B shows a brightness distribution in the X-axis direction, wherein the X-axis direction is the horizontal direction and the Y-axis direction is the vertical direction of the line-of-sight sensor image. FIG. 10 shows a schematic flowchart of a line-of-sight detection operation.

The infrared light emitted from the two infrared LEDs 14 aligned along the X-axis direction illuminates the cornea of the user's eyeball 21. Two corneal reflection images are formed by part of the infrared light reflected on the surface of cornea (two corneal reflection images corresponding to the two infrared LEDs 14) near the line-of-sight image sensor 19 as denoted at Pd and Pe in the line-of-sight sensor image shown in FIG. 9A. Similarly, an optical image of the pupil of the eyeball 21 formed near the line-of-sight image sensor 19 appears as a pupil image 212 in the line-of-sight sensor image. An optical image of the iris of the eyeball 21 formed near the line-of-sight image sensor 19 appears as an iris image 213 in the line-of-sight sensor image. Hereinafter, two end portions in the X-axis direction of the pupil image 212 shall be referred to as pupil edge images 212a and 212b. The corneal reflection images Pd and Pe appear inside of the pupil image 212 or iris image 213. In this embodiment, the line-of-sight-optical-system's optical axis 22 is directed upward from the lower side of the Y axis toward the display-optical-system's optical axis 23 (the line-of-sight-optical-system's optical axis 22 is directed upward toward the eyeball 21 from the lower eyelid 28 side), so that the pupil image 212 and iris image 213 appear as an upwardly narrowing shape.

With the start of the line-of-sight detection operation, at step S801 in FIG. 10, the infrared LEDs 14 emit infrared light. For example, the infrared LEDs 14 emit the infrared light toward the user's eyeball 21. An optical image of the user's eyeball illuminated with the infrared light is formed on the line-of-sight image sensor 19 through the line-of-sight optical system 18 and converted into an electrical signal. Thus a processible electrical signal of the line-of-sight sensor image is obtained.

At Step S802, the line-of-sight detector 201 sends an image obtained from the line-of-sight image sensor 19 (line-of-sight sensor image) to the CPU 3.

At step S803, the CPU 3 determines the coordinates of points corresponding to the corneal reflection images and pupil center from the line-of-sight sensor image obtained at step S802.

As shown in FIG. 9B, an exceedingly high level of brightness is obtained at the coordinates Xd and Xe of the corneal reflection images Pd and Pe. In the region of the pupil image 212 (from the coordinate Xa corresponding to the pupil edge image 212a to the coordinate Xb corresponding to the pupil edge image 212b), an exceedingly low level of brightness is obtained except for those of the coordinates Xd and Xe. In the region of the iris image 213 outside the pupil image 212, a brightness of a level between the above two levels of brightness is obtained. The x-coordinates Xd and Xe of the corneal reflection images Pd and Pe and x-coordinates Xa and Xb of the pupil edge images 212a and 212b can be obtained from a brightness distribution such as the one shown in FIG. 9B. The midpoint between the x-coordinates Xa and Xb can be calculated as an x-coordinate Xc corresponding to the pupil center c.

At step S804, the CPU 3 calculates an imaging magnification β of the eyeball image. The imaging magnification β is a magnification determined by the position (relative position) of the eyeball 21 relative to the line-of-sight optical system 18, and can be calculated by use of a function of the distance (Xd−Xe) between the corneal reflection images Pd and Pe.

At step S805, the CPU 3 calculates rotation angles of the optical axis of the eyeball 21 relative to the line-of-sight-optical-system's optical axis 22. The x-coordinate of the midpoint between the corneal reflection images Pd and Pe substantially matches the x-coordinate of the center of curvature of the cornea. Therefore, the rotation angle θx of the eyeball 21 in the X-Z plane can be calculated approximately by the following equation 2, wherein Oc represents a standard distance from the center of curvature of the cornea to the center of the pupil. Similarly, the rotation angle θy of the eyeball 21 in the Y-Z plane can be calculated, too.

$$\beta \times Oc \times \mathrm{SIN}\ \theta x \approx \{(Xd+Xe)/2\} - Xc \qquad \text{(Equation 2)}$$

At step S806, the CPU 3 estimates the coordinates (Hx, Hy) of the user's gaze position (gaze point, the position the user's line of sight points at, the position the user is looking at) on the display surface of the EVF panel 6 with the use of the rotation angles θx and θy calculated at step S805.

At step S807, the CPU 3 stores the estimated coordinates (Hx, Hy) of the gaze position in the memory unit 4, and ends the line-of-sight detection operation.

Figure 8A:
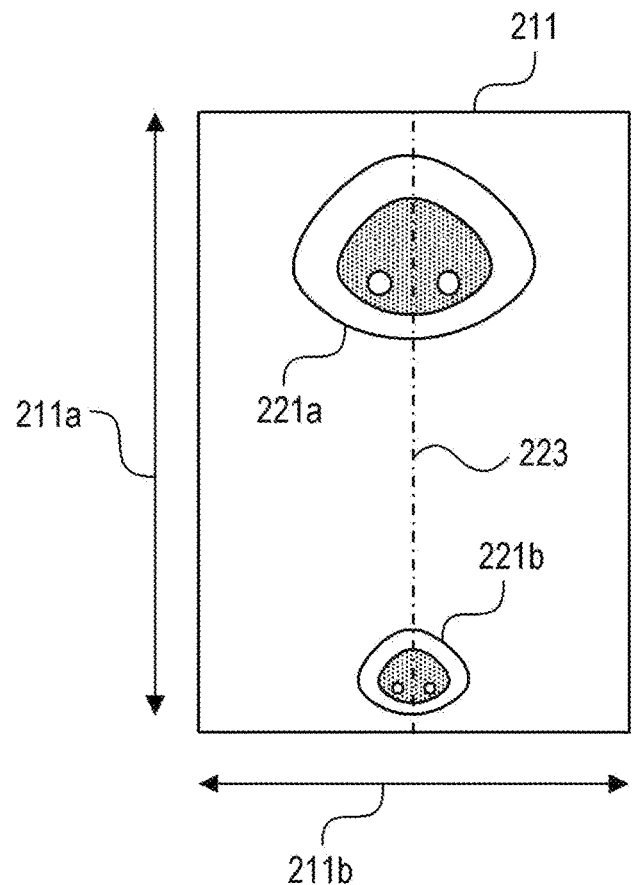
FIGS. 8A and 8B are diagrams illustrating line-of-sight sensor images.
Figure 8B:
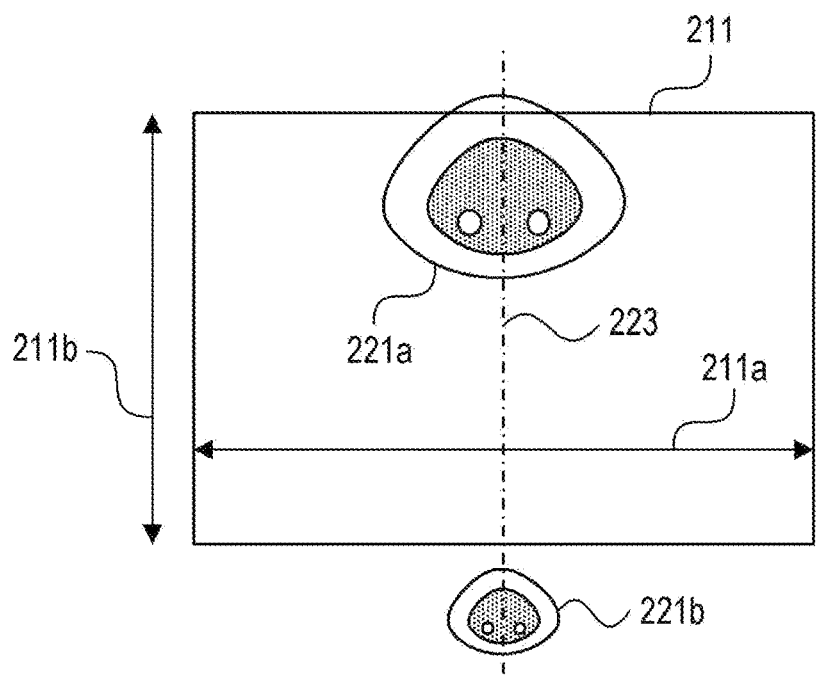

The line-of-sight sensor image is described with reference to FIGS. 8A and 8B. The eyeball 21 does not stay in one position relative to the EVF unit 1C. For example, depending on whether the user wears eyeglasses or not, on user's health conditions or hair styles, or on whether the user wears a hat or not, the position of the eyeball 21 of the user peering in at the EVF panel 6 varies. FIG. 4 illustrates two eyeballs 21 located on the display-optical-system's optical axis 23, the eyeball 21a being closer to the EVF panel 6 and the eyeball 21b being away from the EVF panel 6. FIGS. 8A and 8B show line-of-sight sensor images 211 of the eyeball 21a and the eyeball 21b overlapped on one another.

FIG. 8A shows the line-of-sight sensor image 211 according to this embodiment, and FIG. 8B shows a common line-of-sight sensor image 211 for comparison. Both cases of FIG. 8A and FIG. 8B use the same line-of-sight-optical-system's optical axis 22 and the line-of-sight optical system 18, but the line-of-sight image sensor 19 is oriented differently (vertical/horizontal of the imaging plane).

The eyeball image 221a is an image of the eyeball 21a formed near the line-of-sight image sensor 19, and the eyeball image 221b is an image of the eyeball 21b formed near the line-of-sight image sensor 19. Not to mention, an actual line-of-sight sensor image would not show both of the eyeball image 221a and the eyeball image 221b, and would show only one of them. Reference numeral 223 denotes a projected optical axis, which is a straight line of the display-optical-system's optical axis 23 projected onto the line-of-sight sensor image 211 (imaging plane of the line-of-sight image sensor 19).

The imaging plane of the line-of-sight image sensor 19 is rectangular, and so is the line-of-sight sensor image. In FIGS. 8A and 8B, the line-of-sight sensor image 211 is a rectangular image having a long side 211a and a short side 211b. The length of the long side 211a is longer than the length of the short side 211b. In FIG. 8A (this embodiment), the projected optical axis 223 is substantially parallel to the long side 211a of the line-of-sight sensor image 211 (long side of the line-of-sight image sensor 19). On the other hand, in FIG. 8B (comparative example), the projected optical axis 223 is substantially parallel to the short side 211b of the line-of-sight sensor image 211 (substantially perpendicular to the long side 211a).

As can be seen from a comparison between FIG. 8A and FIG. 8B, the eyeball image 221b is not included in the line-of-sight sensor image 211 in FIG. 8B (comparative example), whereas in FIG. 8A (this embodiment), the eyeball image 221b is completely included in the line-of-sight sensor image 211. That is to say, while the comparative example fails to capture the eyeball 21b, this embodiment successfully captures the eyeball 21b.

When peering into the EVF unit 1C, the user adjusts the position of the eyeball 21 so that the eyeball center will be closer to the display-optical-system's optical axis 23. Nevertheless, the position of the eyeball 21 on the display-optical-system's optical axis 23 varies as described above. According to this embodiment, the projected optical axis 223 being substantially parallel to the long side 211a of the line-of-sight sensor image 211 (long side of the line-of-sight image sensor 19) enables the line-of-sight detection system 20 to detect the eyeball from a wider range on the display-optical-system's optical axis 23. Therefore, the line-of-sight detection system can capture the eyeball 21 even when the eyeball 21 is positioned away from the eyepiece window 13.

While a preferred embodiment of the present invention has been described with reference to the accompanying drawings, the present invention is not limited to the above-described embodiment. The present invention in the above-described embodiment can be interpreted as being applied to an imaging apparatus, or as being applied to a finder apparatus. The present invention can be applied to any apparatus that has a display panel, in which the distance between the display panel and an eye that looks at the display panel can vary. For example, the present invention is applicable to a display apparatus such as an HMD (Head Mount Display). In the case where the present invention is applied to an HMD, for example, the line-of-sight detection system 20 is used as at least one of the line-of-sight detection system for the right eye and the line-of-sight detection system for the left eye of the HMD, so that the HMD detects the line of sight of the user wearing the HMD (line of sight of at least one of the right eye and the left eye). In some HMDs, the display panel has a rectangular display surface, which is provided in an orientation such that the long side of the display surface is substantially parallel to the up and down direction when the HMD orientation is in a normal position state. In such a case, too, the line-of-sight detection system may be disposed such that the projected optical axis is substantially parallel to the long side of the line-of-sight sensor image (long side of the line-of-sight image sensor). The line-of-sight image sensor 19 is disposed horizontally on the left side or right side of the EVF panel 6 that is oriented vertically when the HMD orientation is in the normal position state, for example. Any configurations obtained by suitably modifying or changing some configurations of the above-described embodiment within the scope of the subject matter of the present invention are also included in the present invention.

The present invention makes it easier to capture the user's eye without causing an increase in apparatus size or cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-003484, filed on Jan. 13, 2022, which is hereby incorporated by reference herein in its entirety.

What is claimed is:
1. A display apparatus comprising:
a display panel;
a lens configured to enable a user to see an image displayed on the display panel;
an image sensor for capturing an eye of the user looking at the display panel, the image sensor having a rectangular imaging plane; and
an imaging optical system for forming an optical image of the eye on the imaging plane, wherein
the imaging optical system has an optical axis that is nonparallel to an optical axis of the lens,
a projected line of the optical axis of the lens on the imaging plane is substantially parallel to a long side of the imaging plane,
the lens is a lens having a shape as obtained by removing a part of a peripheral portion of a circular shape from the circular shape in a view from the direction parallel to the optical axis of the lens, and
the imaging optical system is disposed such that at least part of the image sensor is included in a region as formed by removing the part of the peripheral portion in the view from the direction parallel to the optical axis of the lens.

2. The display apparatus according to claim 1, wherein the image sensor is disposed upward from below the optical axis of the lens in a case where the display apparatus is in a predetermined orientation.

3. The display apparatus according to claim 2, wherein the image sensor is disposed upward from below the display panel in a case where the display apparatus is in the predetermined orientation.

4. The display apparatus according to claim 3, wherein the display panel has a display surface that is rectangular with a long side substantially parallel to a left and right direction in a case where the display apparatus is in the predetermined orientation.

5. The display apparatus according to claim 4, wherein the display surface has a long side and a short side, and an aspect ratio of a length of the long side to a length of the short side is substantially 4:3.

6. The display apparatus according to claim 1, wherein the lens has the shape as obtained by cutting off the part of the peripheral portion in the view from the direction parallel to the optical axis of the lens.

7. The display apparatus according to claim 6, wherein the lens has the shape as obtained by cutting off the part of the peripheral portion along a cut-off line including a straight portion substantially parallel to a side of a display surface of the display panel in the view from the direction parallel to the optical axis of the lens.

8. The display apparatus according to claim 1, further comprising
a detector configured to detect a gaze of the user based on an image of the eye captured by the image sensor.

9. A finder apparatus comprising:
the display apparatus according to claim 1; and
an eyepiece portion where the eye approach.

10. An imaging apparatus comprising:
a second image sensor for capturing an object; and
the display apparatus according to claim 1 capable of displaying an image of the object captured by the second image sensor.

* * * * *